(12) United States Patent
Ryu et al.

(10) Patent No.: US 7,589,330 B2
(45) Date of Patent: Sep. 15, 2009

(54) ULTRAVIOLET MICROSCOPE APPARATUS

(75) Inventors: Go Ryu, Kawasaki (JP); Daisuke Yokoi, Tokorozawa (JP); Masato Yabe, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/214,834

(22) Filed: Jun. 23, 2008

(65) Prior Publication Data

US 2008/0315136 A1 Dec. 25, 2008

(30) Foreign Application Priority Data

Jun. 25, 2007 (JP) ............................. 2007-166423
Jan. 8, 2008 (JP) ............................. 2008-000981

(51) Int. Cl.
*G01N 21/64* (2006.01)
(52) U.S. Cl. .................... 250/461.1; 250/372
(58) Field of Classification Search ................. 250/580, 250/372, 461.1
See application file for complete search history.

(56) References Cited

U.S. PATENT DOCUMENTS 5,717,518 A * 2/1998 Shafer et al. ................. 359/357

FOREIGN PATENT DOCUMENTS

JP 3324780 B2 5/1993
JP 2006-154237 A 6/2006

* cited by examiner

*Primary Examiner*—David P Porta
*Assistant Examiner*—Mark R Gaworecki
(74) *Attorney, Agent, or Firm*—Frishauf, Holtz, Goodman & Chick, P.C.

(57) ABSTRACT

A camera obtains an observation image of a sample by capturing the image of the sample on which an ultraviolet light generated by a light source device is irradiated. An image processing unit of a controlling device generates a synthesis observation image of the sample based on a plurality of observation images of the sample, which are obtained by being captured by the camera in the same field of view with switching of the wavelength band of the ultraviolet light irradiated on the sample. A display unit of the controlling device displays the image generated by the image processing unit.

13 Claims, 13 Drawing Sheets

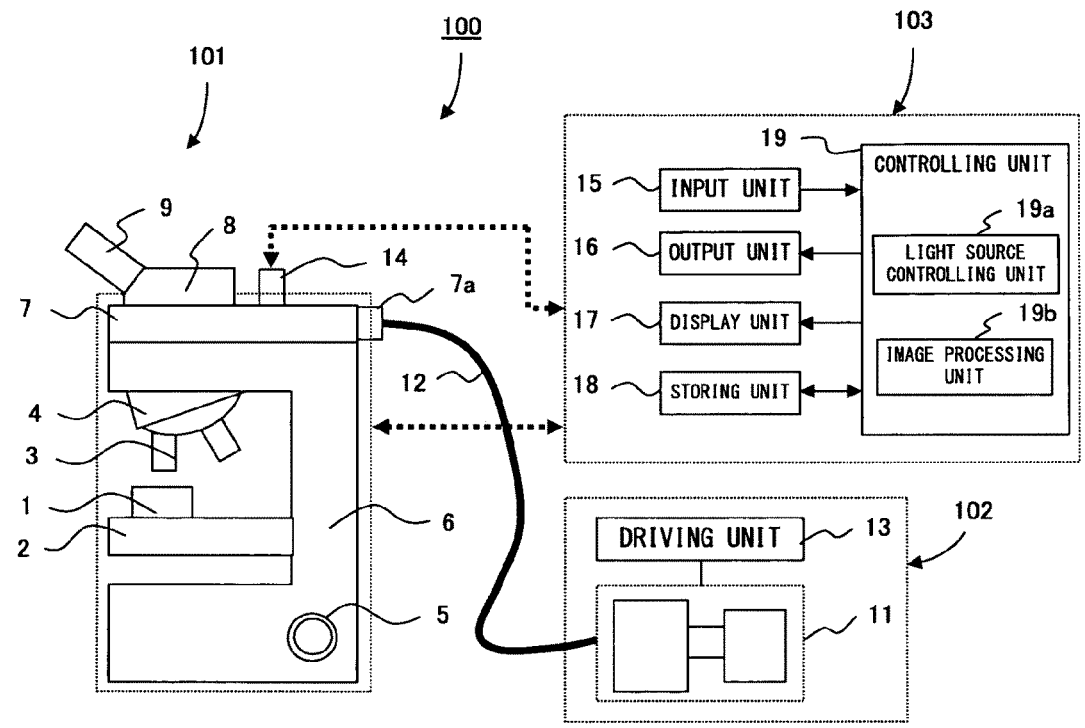
F I G. 1

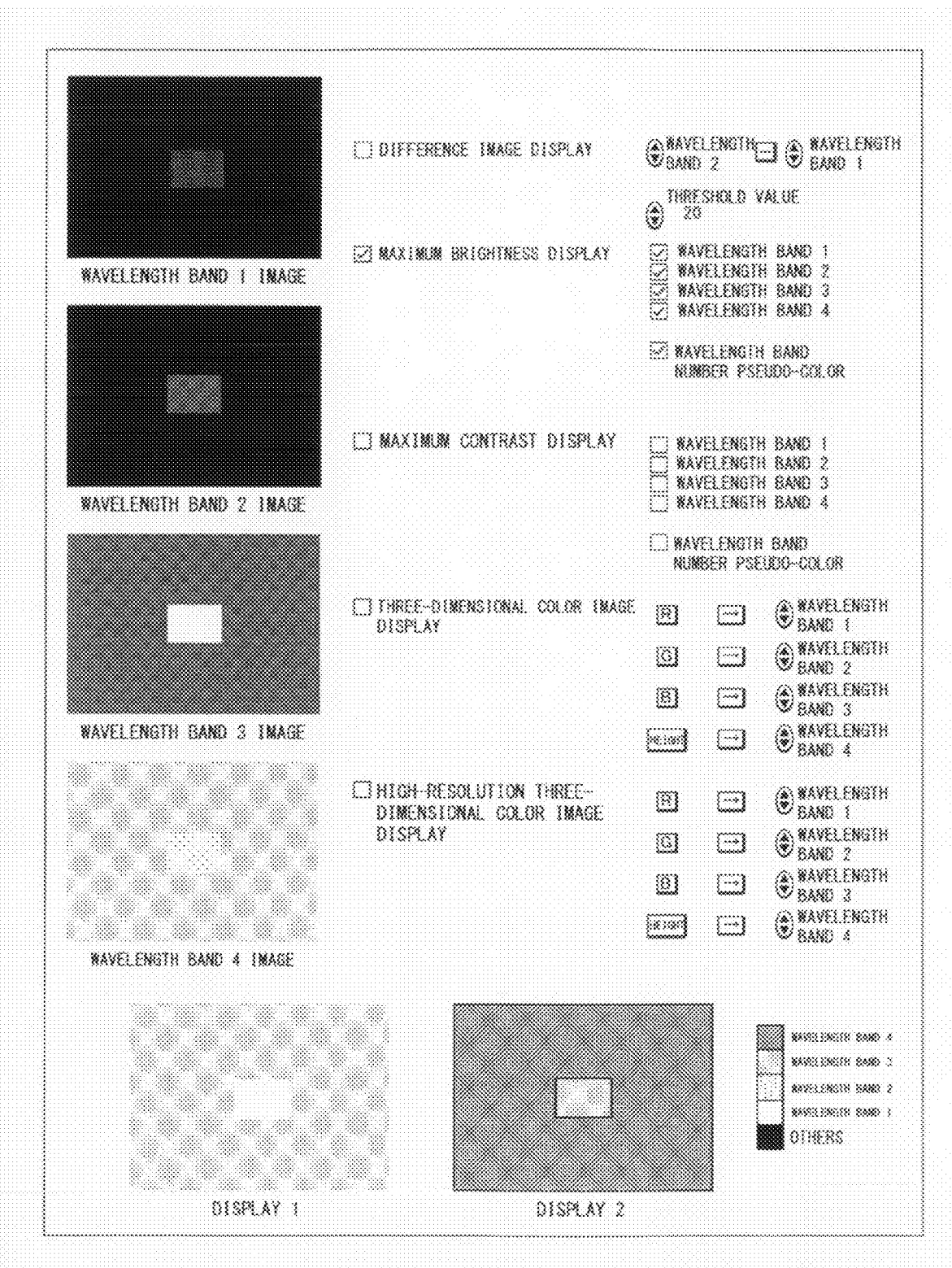
F I G. 5

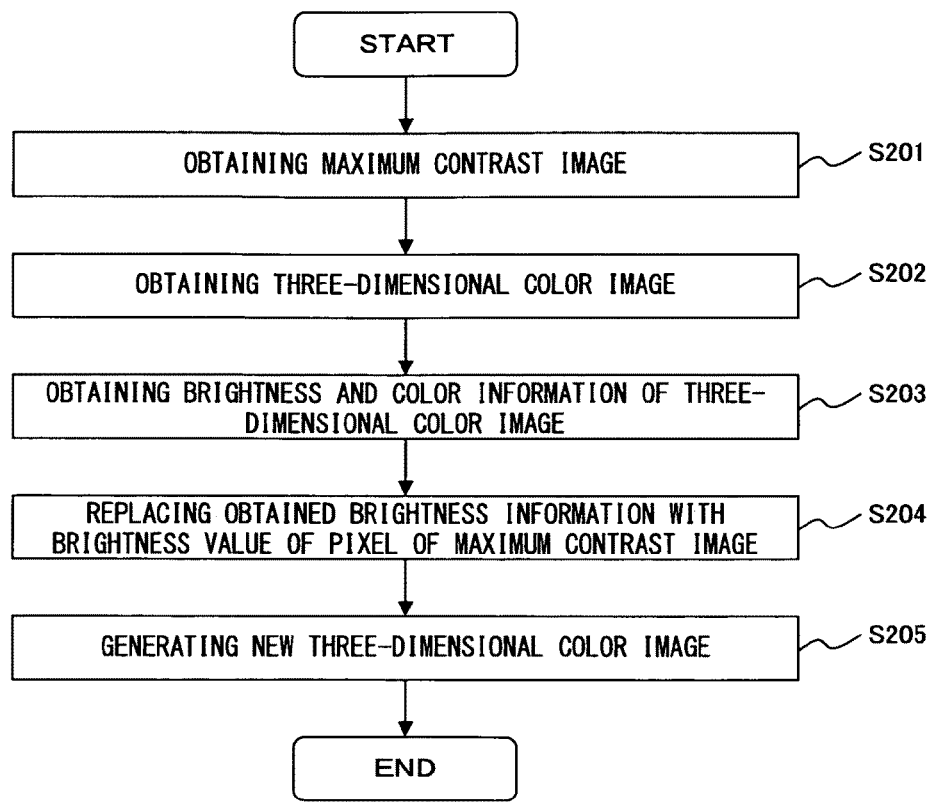
F I G. 10

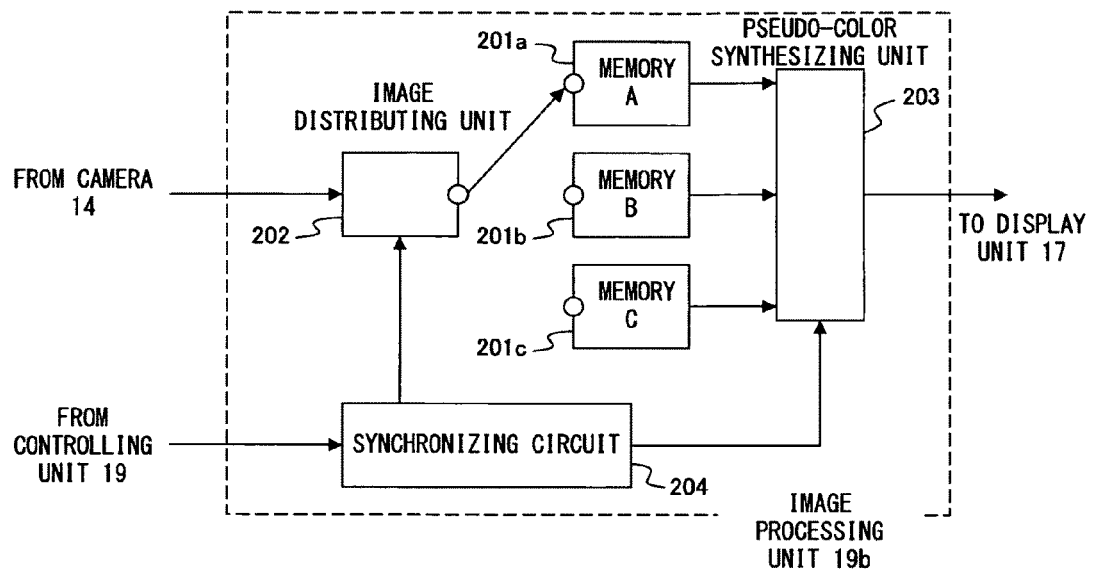
F I G. 1 1

ULTRAVIOLET MICROSCOPE APPARATUS

CROSS REFERENCE TO RELATED APPLICATIONS

This application claims benefit of Japanese Applications No. 2007-166423, filed Jun. 25, 2007, and No. 2008-000981, filed Jan. 8, 2008, the contents of which are incorporated by this reference.

BACKGROUND OF THE INVENTION

1. Field of the Invention

The present invention relates to a technique of a microscope, and more particularly, to a technique of an ultraviolet microscope for observing or examining a sample by using ultraviolet lights in a plurality of different wavelength bands.

2. Description of the Related Art

Conventionally, optical microscopes are widely used for fault examinations, structural observations, etc. of device patterns in semiconductor manufacturing processes. With the rapid advance in the shrinkages and the complexities of device patterns in recent years, the demand for improving the resolutions of optical microscopes has been increasing.

In order to meet such a demand, ultraviolet microscopes that implement a higher resolution by using an ultraviolet (UV) light as an illumination light as disclosed, for example, by Japanese unexamined patent application publication No. 2006-154237, and Japanese examined patent application publication No. 3324780 were developed. With such ultraviolet microscopes, a single UV light in a narrow wavelength band is used as an illumination light in many cases in order to avoid color aberration.

In the meantime, materials such as aluminum, copper, etc. used for semiconductor devices, etc. have reflectivities and absorption rates, which differ against ultraviolet lights in different wavelength bands. It is essential to use this characteristic in the above described fault examinations and structural analyses.

Specifically, a device material can be identified based on the degree of change when a semiconductor device is observed, for example, by changing the wavelength band of an ultraviolet light used for illumination, and by obtaining a change in the reflectivity of the device material with the detection of a change in a pixel value (the brightness value of each pixel) of an observation image at the time of observation.

A microscope system having a function to irradiate ultraviolet lights in a plurality of wavelength bands, a function to capture the image of a sample, and a function to display the captured image of the sample is required to identify a device material with the above described technique. Here, such a microscope system is referred to as a "multiband UV microscope system".

Unlike conventional UV microscopes, the multiband UV microscope changes the wavelength band of an illumination light, and obtains observation images in a plurality of wavelength bands. Highlighting differences of the observation images respectively obtained by switching the wavelength band of the illumination light is essential to an observer so that he or she can easily identify the characteristic of a sample material only at a glance of an observation image.

SUMMARY OF THE INVENTION

An ultraviolet microscope apparatus in one aspect of the present invention is an ultraviolet microscope apparatus comprising a light source for generating an ultraviolet light, an image capturing unit for obtaining an observation image of a sample by capturing the image of the sample on which the ultraviolet light is irradiated, a synthesis observation image generating unit for generating a synthesis observation image of the sample based on a plurality of observation images of the same sample, which are obtained by being captured by the image capturing unit in the same field of view by switching the wavelength band of the ultraviolet light, and a display unit for displaying the image generated by the synthesis observation image generating unit.

BRIEF DESCRIPTION OF THE DRAWINGS

The present invention will be more apparent from the following detailed description when the accompanying drawings are referenced.

FIG. 1 is a schematic diagram showing a configuration of a multiband ultraviolet microscope apparatus for carrying out the present invention;

FIG. 5 is a schematic diagram (No. 2) showing a display example of synthesis observation images on the GUI Screen;

FIG. 10 is a flowchart showing the contents of a process for generating a three-dimensional color maximum contrast image;

FIG. 11 is a functional block diagram of an image processing unit for executing a process for generating a two-dimensional pseudo-color image in which occurrences of a color shift are reduced;

DESCRIPTION OF THE PREFERRED EMBODIMENTS

Figure 2:
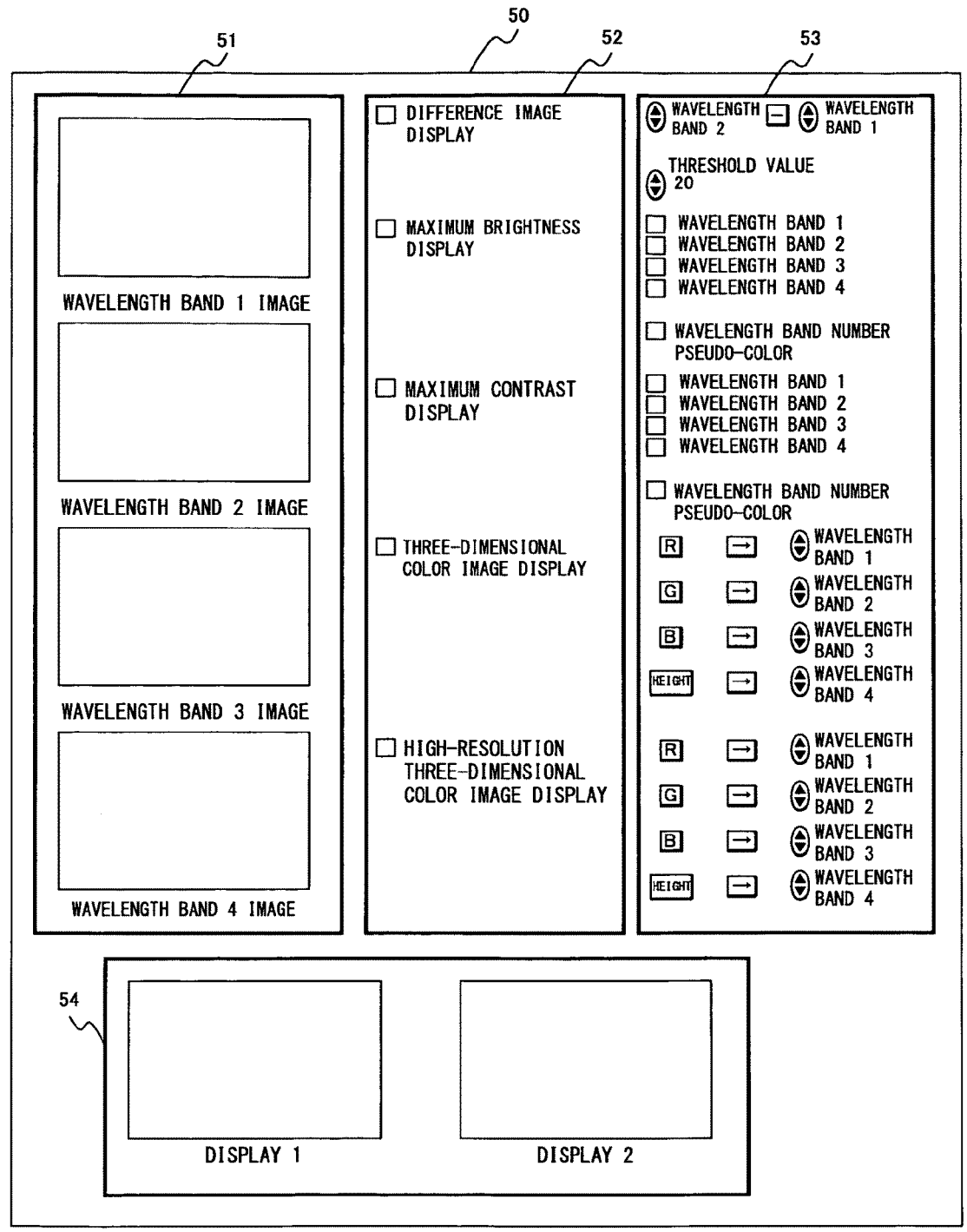
FIG. 2 is a schematic diagram showing an example of a GUI screen.

Preferred embodiments according to the present invention are described below with reference to the drawings. It is to be understood that the present invention is not limited to this preferred embodiment.

FIG. 1 is initially described. This figure shows the configuration of a multiband ultraviolet microscope apparatus for carrying out the invention.

The multiband ultraviolet microscope apparatus 100 shown in FIG. 1 comprises a microscope 101, a light source device 102, and a controlling device 103.

The microscope 101 comprises a stage 2, objective lenses 3, a revolver 4, a focusing mechanism 5, a mount 6, an illuminator 7, an observation tube 8, and a binocular unit 9.

On the stage 2, a sample 1 is put. The objective lenses 3 are held by the revolver 4 so that any of the objective lenses 3 is positioned above the sample 1 put on the stage 2. The mount 6 holds the revolver 4, and supports the stage 2 via the focusing mechanism 5. The illuminator 7 is placed on the top of the mount 6, and the eyepiece unit 9 is provided on the top of the illuminator 7 via the observation tube 8.

The light source device 102 comprises a wavelength selecting unit 11 and a driving unit 13, and is connected to the microscope 101 via an optical fiber 12.

The wavelength selecting unit 11 includes a light source for generating an ultraviolet light, and extracts and emits ultraviolet lights in different wavelength bands from among lights emitted by the light source. The wavelength bands of the ultraviolet lights are assumed to be 230 to 275 nm as a wavelength band 1, 275 to 340 nm as a wavelength band 2, 340 to 380 nm as a wavelength band 3, and 380 to 440 nm as a wavelength band 4, respectively. The number of wavelength bands, and the width of each wavelength band can be arbitrarily set.

The optical fiber 12 that receives the ultraviolet lights emitted from the wavelength selecting unit 11 leads the ultraviolet lights to the microscope 101. The wavelength selecting unit 11 also comprises internal shutters not shown. By suitably combining and opening/closing the internal shutters, the wavelength selecting unit 11 can emit ultraviolet lights in different wavelength bands. The light source device 102 and the illuminator 7 compose multiband illumination system. The wavelength selecting unit 11 also comprises an internal ND (Neutral Density) filter not shown. By rotating the internal ND filter, the wavelength selecting unit 11 can vary the quantity of an ultraviolet light.

The driving unit 13 is electrically connected to the wavelength selecting unit 11, and controls the settings and the driving of the wave selecting unit 11.

The objective lenses 32 are attached to the revolver 4 to be freely attachable/detachable. The objective lens 3 selected by rotating the revolver 3 is positioned above the stage 2. The stage 2 can be freely moved by a flat plane driving mechanism not shown within a flat plane orthogonal to the optical axis of the objective lens 3, thereby changing the position of the sample 1 on the flat plane with respect to the objective lens 3. Additionally, the stage 2 can be moved up/down by the focusing mechanism 5, thereby achieving the focus of the sample 1 with respect to the objective lens 3.

The illuminator 7 includes an illumination optics system and an observation optics system, which are not shown. A camera 14 is provided on the top of the illuminator 7, and the optical fiber 12 is attached to the illuminator 7 via a fiber connector 7a. The illumination optics system within the illuminator 7 irradiates ultraviolet lights, which are led from the wavelength selecting unit 11 via the optical fiber 12, on the sample 1 as an illumination light via the objective lens 3. The observation optics system within the illuminator 7 forms an observation image of the sample, which is irradiated by an ultraviolet light, in cooperation with the objective lens 3. The camera 14 that is an image capturing unit captures and obtains the observation image, and outputs observation image data representing the observation image to the controlling device 103.

The observation tube 8 includes an image forming lens not shown, and forms, in cooperation with the objective lens 3, a visible observation image of the sample 1 on which a visible light is irradiated by an illuminating device that is not shown and arranged below the stage 2. The visible observation image can be visually observed via the eyepiece unit 9.

The controlling device 103 comprises an input unit 15, an output unit, a display unit 17, and a storing unit 18, which respectively inputs, outputs, displays, and stores various types of information such as image data etc., and a control unit 19 for controlling various types of operations of the multiband ultraviolet microscope apparatus 100.

The input unit 15 is configured with a keyboard, a mouse, a communication device, etc., and obtains an input instruction such as various types of setting parameters issued from a user in cooperation with GUI (Graphical User Interface) displayed on the display unit 17.

The output unit 16 is configured with a communication device, a portable storage medium, etc., and externally outputs various types of observation data including observation image data, processing data, etc.

The display unit 17 is configured with a liquid crystal display, etc., and displays an observation image, setting information, notice information.

The storing unit 18 is configured with a hard disk, ROM, RAM, etc. The storing unit 18 prestores a control program for controlling various types of operations of the multiband ultraviolet microscope apparatus 100, and stores various types of observation data including observation image data, and the like depending on need.

The control unit 19 is intended to control the operations of the units of the multiband ultraviolet microscope apparatus 100. Particularly, the control unit 19 comprises a light source controlling unit 19a for controlling the light source device 102, and an image processing unit 19b for processing an observation image. Here, the light source controlling unit 19a controls the driving unit 13 according to wavelength instruction information for instructing a combination pattern of wavelength bands of ultraviolet lights emitted to the wavelength selecting unit 11 to change settings within the wavelength selecting unit 11. The image processing unit 19b executes various types of processes for an observation image based on observation image data.

The control unit 19 is configured with an MPU (Micro Processing Unit). The MPU executes the above described controls by reading and executing the control program stored in the storing unit 18.

The controlling device 103 can be also configured, for example, with a computer having a standard configuration, namely, a computer configured by comprising a processor such as an MPU, etc. for controlling the operations of the entire computer by executing a control program, a main memory that the processor uses as a working memory depending on need, a storage device such as a hard disk device, etc. for storing and saving various types of programs, control data, etc., an interface unit for managing transmissions/receptions of various types of data made among the camera 14, the microscope 101, and the light source device 102, an input device for obtaining an instruction that is displayed by being made to correspond to various types of operations and issued from an operator, and a display device for displaying various types of information.

Operational procedures for causing the multiband ultraviolet microscope device 100 shown in FIG. 1 to display various types of images are descried next.

FIG. 2 is initially described. This figure shows an example of a GUI screen displayed on the display unit 17 of the controlling device 103. The control unit 19 causes the display unit 17 to display this GUI screen 50. This screen is displayed in a way such that the MPU of the control unit 19 reads and executes the control program stored in the storing unit 18. The control unit 19 detects an operation that a user performs to the input unit 15 while referencing the GUI screen 50 of the multiband ultraviolet microscope apparatus 100, and obtains the detection result as an instruction issued from the user. Additionally, the control unit 19 fits various types of images of the sample 1, which are obtained by the multiband ultraviolet microscope apparatus 100, into the GUI screen 50, and displays the images.

Initially, a user puts the sample 1 on the stage 2. Then, the user achieves the focus of the sample 1 and sets an observation position by moving up/down the stage 2 in the direction of the optical axis of the objective lens 3 and moving the stage 2 within the flat plane orthogonal to the direction of the optical axis while visually observing a visible observation image via the eyepiece unit 9 by irradiating a visible light on the sample 1. The focus achievement and the observation position setting may be made by irradiating an ultraviolet light on the sample 1, and by causing the display device to display an image obtained with the camera 14 as will be described later. Alternatively, the position at which the focus of the sample 1 is achieved may be automatically detected by using a known auto-focus function.

Upon completion of these operations, the user issues an instruction to start observation to the control unit 19 by operating the input unit 15.

The control unit 19 functions as the light source controlling unit 19a upon obtaining the instruction to start observation, controls the light source device 102 to start emitting an ultraviolet light, and further controls the light source device 102 to sequentially switch the wavelength band of the ultraviolet light emitted to the wavelength selecting unit 11. At the same time, the control unit 19 controls the camera 14 to sequentially capture images of the sample 1, which is irradiated by using ultraviolet lights in different wavelength bands as illumination lights, in the same field of view, and causes the camera 14 to obtain a plurality of observation images of the sample 1, which is irradiated with the ultraviolet lights in the different wavelength bands. The camera 14 transmits thus obtained observation images of the sample 1 to the control unit 19.

Here, the description is provided by taking as an example the case where the observation images are obtained by irradiating each of four types of ultraviolet lights in mutually different wavelength bands on the sample 1.

Next, the control unit 19 stores all of the observation images transmitted from the camera 14 in the storing unit 18, and displays the images in an observation image display section 51 on the GUI screen 50 by establishing a correspondence with the wavelength band of the illumination light. In the screen example shown in FIG. 2, display units for the observation images, which are obtained when the four types of ultraviolet lights in the different wavelength bands are irradiated on the sample 1, are provided in the observation image display section 51 respectively as a "wavelength band 1 image", a "wavelength band 2 image", a "wavelength band 3 image", and a "wavelength band 4 image".

The user who verifies that the observation images are displayed on the GUI screen 50 selects one of display methods indicated in a display method selecting section 52 on the GUI screen 50, and performs on the input unit 15 an operation for ticking the check box arranged by being made to correspond to the selected display method. The control unit 19 obtains the display method made to correspond to the ticked check box as an instruction of the display method issued from the user.

Then, by operating the input unit 15, the user selects an observation image to be used as a basis of the display made with the selected display method, and inputs parameters required for the display made with the selected display method with the use of the parameter input section 53.

Upon obtaining the selection result of the observation image and the input results of the parameters, the control unit 19 functions as the image processing unit 19b, and generates a synthesis observation image of the sample 1 by executing an image process for generating an image with the selected display method based on the selected observation image. Then, the control unit 19 fits the generated synthesis observation image into a "display 1" or a "display 2" in a display result section 54 on the GUI screen 50, and displays the image on the display unit 17.

A specific example of generation of the synthesis observation image by the image processing unit 19 b is described next.

Figure 3:
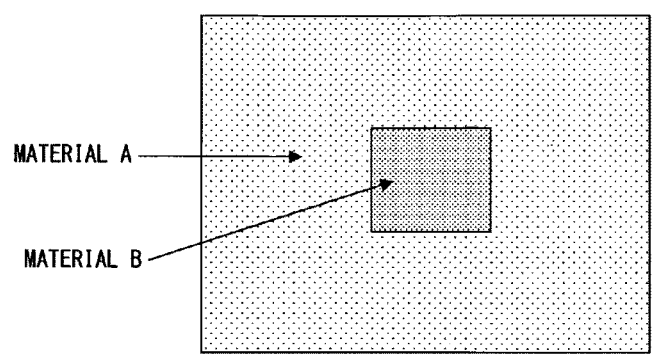
FIG. 3 is a schematic diagram showing an example of a specimen used as a sample.

The following description assumes the use of the specimen shown in FIG. 3 as the sample 1. This sample is composed of materials A and B of two types, the reflectivities of which are mutually different against ultraviolet lights in different wavelength bands. Accordingly, observation images the brightness levels of which are different in the regions of the materials A and B are displayed in the observation image display section 51 on the GUI screen 50. If the wavelength bands of ultraviolet lights irradiated on a sample are different, their reflectivities differ even against the same material. Therefore, the brightness levels of four observation images displayed in the observation image display section 51 differ. An example of the GUI screen 50 on which such observation images are displayed in the observation image display section 51 is shown in FIG. 4.

Generation of a difference image that is one of synthesis observation images is initially described with reference to the screen example shown in FIG. 4.

Figure 4:
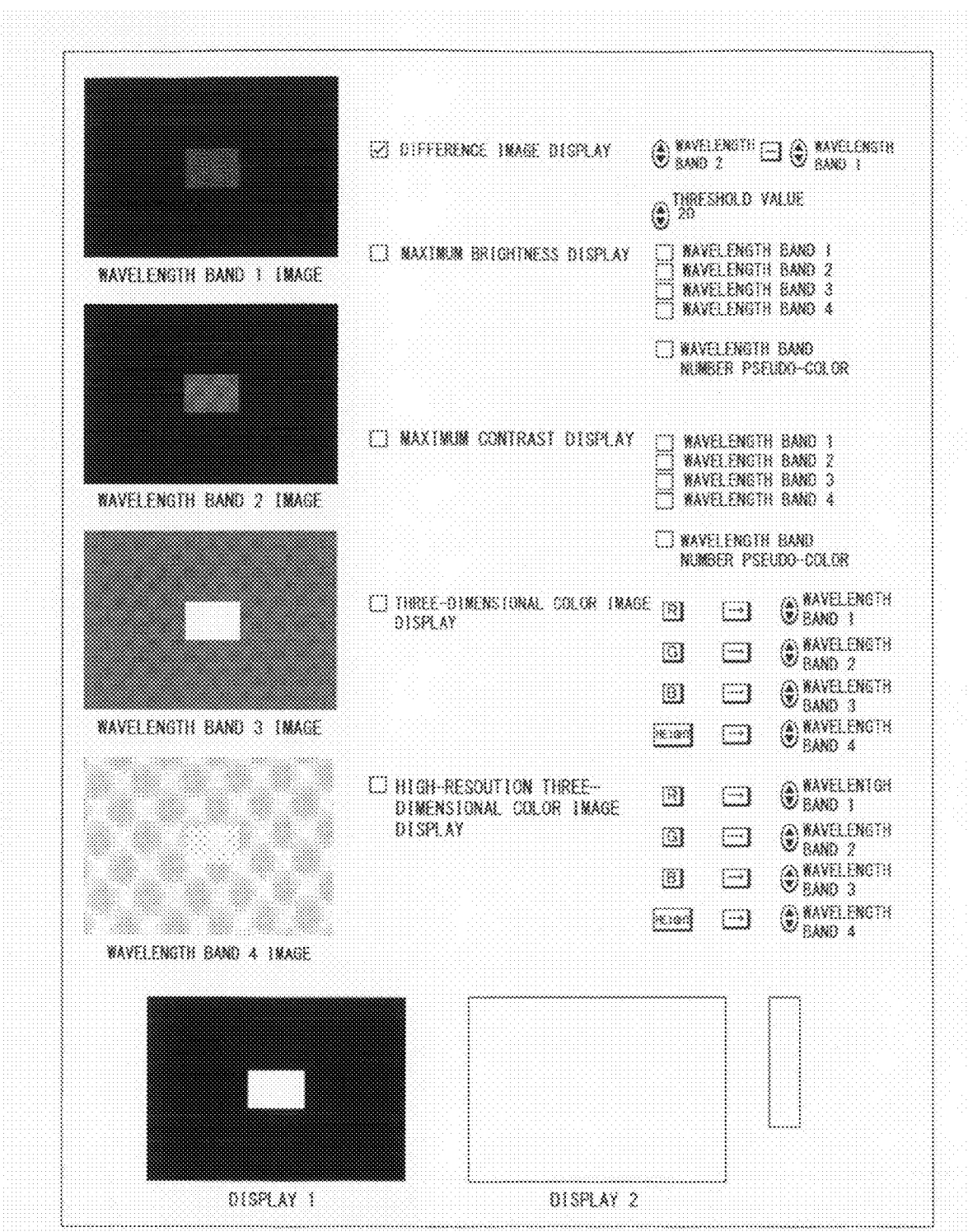
FIG. 4 is a schematic diagram (No. 1) showing a display example of a synthesis observation image on the GUI Screen.

On the GUI screen 50 exemplified in FIG. 4, a "difference image display" and "wavelength band 2–wavelength band 1" are selected respectively in the display method selecting section 52 and the parameter input section 53. Additionally, "threshold value=20" is input. At this time, the image processing unit 19b executes a process for generating a difference image as follows.

Since "wavelength band 2–wavelength band 1" is selected in the parameter input section 53, the image processing unit 19b executes a process for reading from the storing unit 18 observation images obtained when the ultraviolet lights in the "wavelength band 2" and the "wavelength band 1", which are mutually different, are irradiated on the sample 1. Then, the image processing unit 19b executes a process for calculating a difference between brightness values of pixels the positions of which make a correspondence in the two observation images, and further executes a process for binarizing the calculated value of the difference by making a largeness/smallness comparison between the calculated value and the predetermined threshold value "20" input to the parameter input section 53. Then, the image processing unit 19b executes a process for setting the brightness value of the pixel the position of which makes a correspondence in the difference image to be generated to the value resultant from the binarization. The difference image is generated in this way.

The control unit 19 executes a process for fitting thus generated difference image into the "display 1" in the display result section 54 on the GUI screen 50, and for displaying the image on the display unit 17.

In the screen example shown in FIG. 4, the difference image that the image processing unit 19b generates as described above based on the "wavelength band 2 image" and the "wavelength band 1 image" is displayed in the "display 1". In this difference image, the entire regions of the materials B and A are displayed respectively as white (namely, the brightness value is the largest) and as black (namely, the brightness value is the smallest) as a result of the binarization process.

Here, the user can identify the portion composed of the material A in the sample 1 from the difference image if he or she learns beforehand that the reflectivity of the material A against the ultraviolet light in the wavelength band 2 is higher than that in the wavelength band 1. Additionally, the user can also identify the portion composed of the material B in the sample 1 by changing the threshold value input to the parameter input section 53. Namely, the difference mage of the sample 1 makes it easy to identify a difference between reflectivities of two ultraviolet lights in two wavelength bands, which is caused by a difference between the materials respectively forming the portions.

Additionally, a difference image can be also generated by normalizing a difference result instead of binarizing the difference result between brightness values of each pixel. Alternatively, a difference image may be generated by using the difference result unchanged as the brightness value of each pixel without binarizing the difference result.

Generation of a maximum brightness image and a maximum brightness mapping image, both of which are one type of the synthesis observation images, is described next with reference to a screen example shown in FIG. 5.

On the GUI screen 50 shown in FIG. 5, "maximum brightness display" is selected in the display method selecting section 52. Additionally, all of "wavelength band 1", "wavelength band 2", "wavelength band 3", and "wavelength band 4" are selected in the parameter input section 53, and "wavelength band number pseudo-color" is selected in the parameter input section 53. At this time, the image processing unit 19b executes a process for generating a maximum brightness image and a maximum brightness mapping image as follows.

Since all of the "wavelength band 1", the "wavelength band 2", the "wavelength band 3", and the "wavelength band 4" are selected in the parameter input section 53, the image processing unit 19b executes a process for reading from the storing unit 18 the observation images obtained when the ultraviolet lights in the "wavelength band 1", the "wavelength band 2", the "wavelength band 3", and the "wavelength band 4", which are mutually different, are irradiated on the sample 1. Then, the image processing unit 19b executes a process for obtaining the maximum value among the brightness values of pixels the positions of which make a correspondence in the four observation images. Then, the image processing unit 19b executes a process for setting the brightness value of the pixel the position of which makes a correspondence in a maximum brightness image to be generated to the obtained maximum value. The maximum brightness image is generated in this way.

The control unit 19 executes a process for fitting thus generated maximum brightness image into the "display 1" in the display result section 54 on the GUI screen 50, and for displaying the image on the display unit 17.

In the maximum brightness image displayed in the "display 1" in the display result section 54 in the screen example shown in FIG. 5, it is proved that the image in the region of the material A in the "wavelength band 4 image" is fitted into the corresponding region, and the image in the region of the material B in the "wavelength band 3 image" is fitted into the corresponding region.

Subsequent to the generation of the maximum brightness image, the image processing unit 19b executes a process for identifying, for each pixel, an observation image including a pixel that is used as a basis of the brightness value of each pixel configuring the generated maximum brightness image.

Namely, the image processing unit 19b executes a process for obtaining a pixel with the maximum brightness value among pixels, the positions of which make a correspondence, in each of the observation images of the "wavelength band 1 image", the "wavelength band 2 image", the "wavelength band 3 image", and the "wavelength band 4 image", and for obtaining, for each pixel, information indicating which of the "wavelength band 1", the "wavelength band 2", the "wavelength band 3", and the "wavelength band 4" the wavelength band of the ultraviolet light irradiated on the sample 1 when the observation image including the obtained pixel is captured is. Then, the image processing unit 19b executes a process for mapping the obtained information to the pixel the position of which makes a correspondence in a maximum brightness mapping image to be generated. The maximum brightness mapping image is generated in this way.

The control unit 19 executes a process for colorizing thus generated maximum brightness mapping image by executing a process for establishing a correspondence between a hue different depending on information indicating the wavelength band of an ultraviolet light and each pixel for the maximum brightness mapping image, and for displaying the image in color on the display unit 17 by fitting the image into a "display 2" in the display result section 54 on the GUI screen 50.

In the maximum brightness mapping image displayed in the "display 2" of the display result section 54 in the screen example shown in FIG. 5, it is proved that the "wavelength band 4" is mapped to all of pixels in the region composed of the material A in the sample 1, and the "wavelength band 3" is mapped to all of pixels in the region of the material B in the sample 1.

In the screen example shown in FIG. 5, differences of hues in the maximum brightness mapping image are represented by being crosshatched in different shades of gray.

The maximum brightness image and the maximum brightness mapping image are generated in this way. For an observation image obtained by irradiating an ultraviolet light in a single wavelength band, a material partially contained in the sample 1 cannot be identified in some cases unless a plurality of observation images obtained by switching the wavelength band are referenced. With thus generated maximum brightness image, such a material can be easily identified from the sample 1. Additionally, it can be easily learned that the reflectivity of each material partially forming the sample 1 is the highest against an ultraviolet light in which wavelength band. Moreover, a user can identify a material forming each portion in the sample 1 from the maximum brightness mapping image if he or she beforehand learns a relationship between a material and a wavelength band implementing the highest reflectivity.

Alternatively, a minimum brightness image or a medium brightness image can be generated instead of causing the image processing unit 19 b to generate the above described maximum brightness image.

Generation of a maximum contrast image and a maximum contrast mapping image, both of which are one type of the synthesis observation images, is described next with reference to a screen example shown in FIG. 6.

Figure 6:
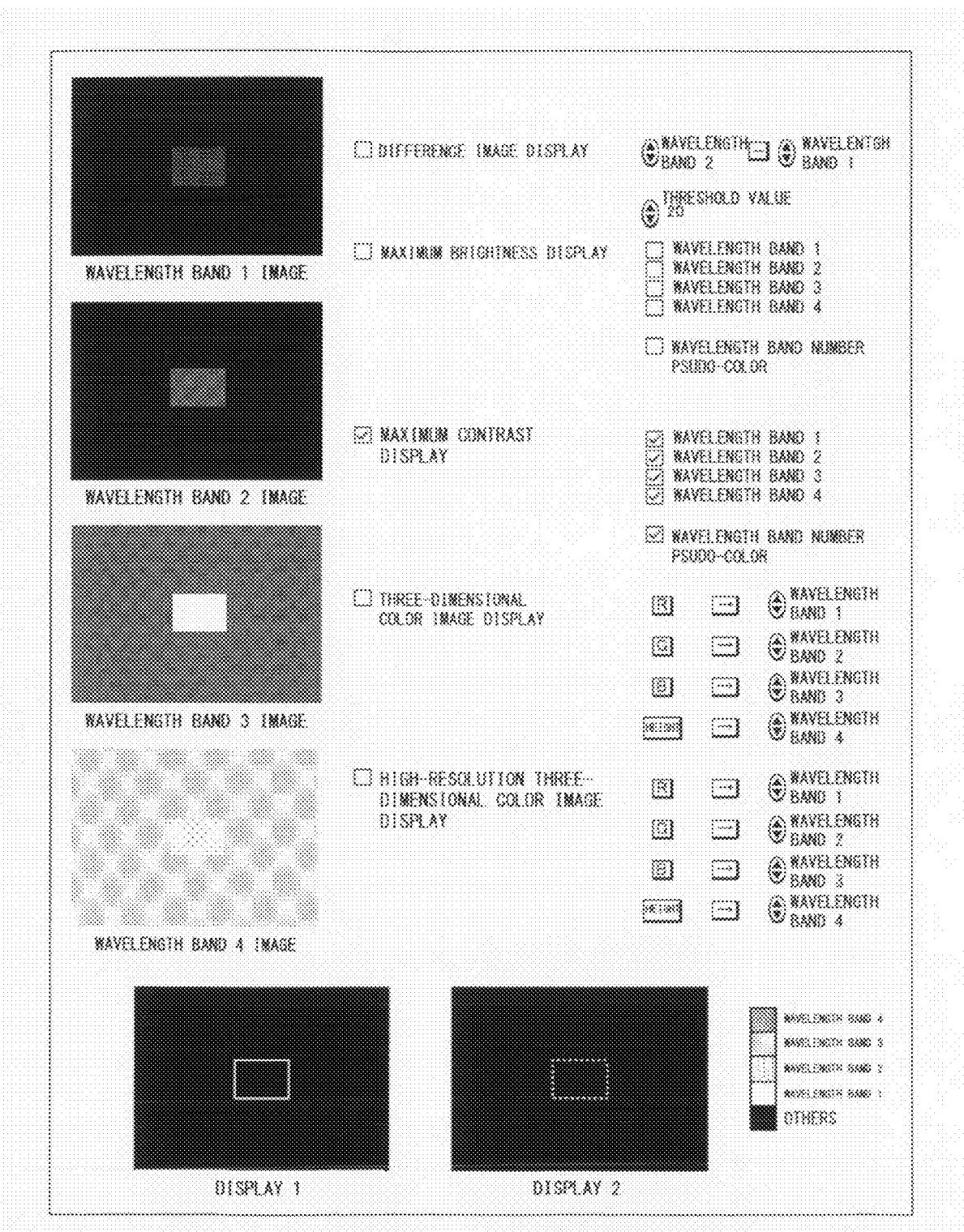
FIG. 6 is a schematic diagram (No. 3) showing a display example of synthesis observation images on the GUI Screen.

On the GUI screen 50 shown in FIG. 6, a "maximum contrast display" is selected in the display method selecting section 52. Additionally, in the parameter input section 53, all of the "wavelength band 1", the "wavelength band 2", the "wavelength band 3", and the "wavelength band 4" are selected, and also a "wavelength band number pseudo-color" is selected. At this time, the image processing unit 19b executes a process for generating a maximum contrast image and a maximum contrast mapping image as follows.

Figure 7:
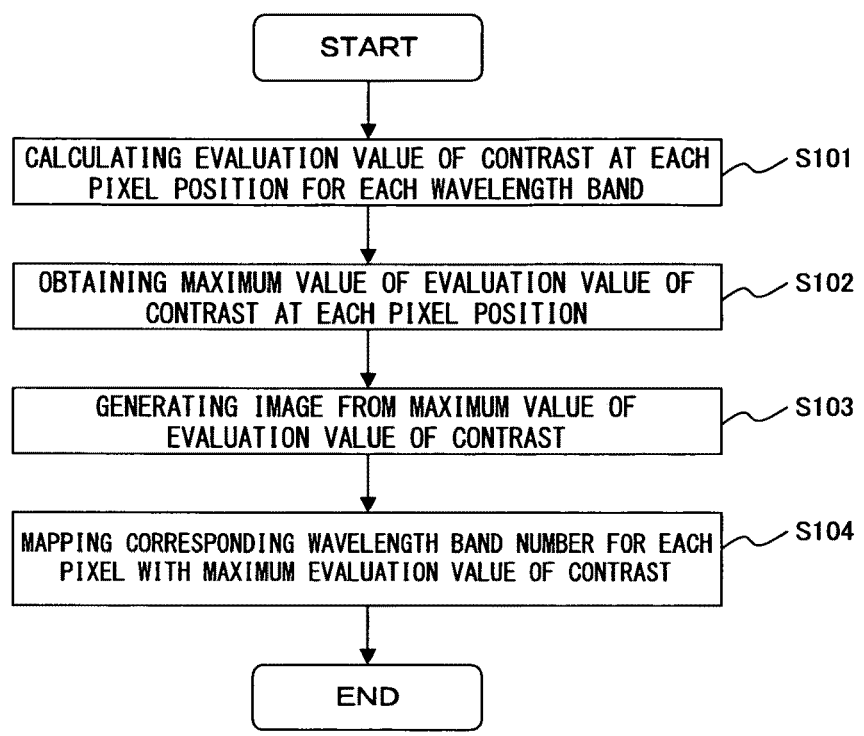
FIG. 7 is a flowchart showing the contents of a process for generating a maximum contrast image and a maximum contrast mapping image.

FIG. 7 is described here. This figure is a flowchart showing the contents of the process for generating a maximum contrast image and a maximum contrast mapping image, which is executed by the image processing unit 19b.

In FIG. 7, initially in step S101, the image processing unit 19b executes a process for calculating, for each pixel, an evaluation value representing a contrast for each of a plurality of observation images obtained by irradiating ultraviolet lights in different wavelength bands on the sample 1.

This preferred embodiment adopts, as a technique for calculating the evaluation value of contrast, a technique for executing a Laplacian Filter process for the total of nine pixels of 3×3 around a pixel to be calculated as a center, and for using the process result as the evaluation value of contrast information of the pixel to be calculated after calculating the process result. The evaluation value of contrast may be obtained, for example, by using a first-order differentiation method or a Fourier transform method as an alternative to the Laplacian Filter process.

Next, in S102, the image processing unit 19b executes a process for obtaining, for each pixel, a pixel with the maximum contrast among pixels the positions of which make a correspondence in the plurality of observation images based on the evaluation value of contrast.

Then, in S103, the image processing unit 19b executes a process for generating a maximum contrast image by using the evaluation value of contrast of the pixel with the maximum contrast, which is obtained with the process of S102, as the brightness value of the pixel the position of which makes a correspondence in the maximum contrast image.

Next, in S104, the image processing unit 19b executes a process for generating a maximum contrast mapping image by mapping information indicating the wavelength band of an ultraviolet light irradiated on the sample 1 when the observation image including the pixel with the maximum contrast, which is obtained with the process of S102, to the pixel the position of which makes a correspondence in the maximum contrast mapping image. Thereafter, the image processing unit 19b terminates the process shown in FIG. 7.

Processing operations of the image processing unit 19b performed when instructions are issued on the GUI screen 50 as in the screen example shown in FIG. 6 are described here.

In the screen example shown in FIG. 6, since all of the "wavelength band 1", the "wavelength band 2", the "wavelength band 3", and the "wavelength band 4" are selected in the parameter input section 53, the image processing unit 19b executes a process for reading from the storing unit 18 the observation images obtained when the ultraviolet lights in the "wavelength band 1", the "wavelength band 2", the "wavelength band 3", and the "wavelength band 4", which are mutually different, are irradiated on the sample 1, and for calculating the evaluation value of contrast for each pixel of each of the observation images. Then, the image processing unit 19b executes a process for setting the brightness value of the pixel the position of which makes a correspondence in the maximum contrast image to be generated to the evaluation value of contrast of the pixel with the maximum contrast in the four observation images. The maximum contrast image is generated in this way.

The control unit 19 executes a process for fitting thus generated maximum contrast image into the "display 1" in the display result section 54 on the GUI screen 50, and for displaying the image on the display unit 17.

In the screen example shown in FIG. 6, the evaluation values of contrast, which are calculated from the observation images such as the "wavelength band 1 image", the "wavelength band 2 image", the "wavelength band 3 image", and the "wavelength band 4 image" are "0" (namely, the contrast is the minimum) in regions except for the boundary between the materials A and B of the sample 1, whereas the evaluation value of contrast of the "wavelength band 3 image" becomes the maximum in the boundary region between the materials A and B of the sample 1. Accordingly, the maximum contrast image displayed in the "display 1" in the display result section 54 results in an image where only the boundary region between the materials A and B of the sample 1 is represented as white.

Subsequent to the generation of the maximum contrast image, the image processing unit 19b executes a process for obtaining, for each pixel, information indicating which of the "wavelength band 1", the "wavelength band 2", the "wavelength band 3", and the "wavelength band 4" the wavelength band of the ultraviolet light irradiated on the sample 1 when an observation image including the pixel with the maximum contrast among the above described four observation images is. Then, the image processing unit 19b executes a process for mapping the obtained information to the pixel the position of which makes a correspondence in the maximum contrast mapping image to be generated. The maximum contrast mapping image is generated in this way.

The control unit 19 executes a process for colorizing thus generated maximum contrast mapping image by executing a process for establishing, for the maximum contrast mapping image, a correspondence between each pixel and a hue different depending on information indicating the wavelength band of an ultraviolet light, and for displaying the image in colors on the display unit 17 by fitting the image into the "display 2" in the display result section 54 on the GUI screen 50.

In the maximum contrast mapping image displayed in the "display 2" of the display result section 54 in the screen example shown in FIG. 6, it is proved that the "wavelength band 3" is mapped to all of pixels in the boundary region between the materials A and B of the sample 1. Because a wavelength band by which a contrast becomes the maximum cannot be identified in the pixels in the other regions, information indicating the wavelength band of an ultraviolet light is not mapped. Therefore, the region of these pixels is filled with black indicating "others".

In the screen example shown in FIG. 6, the color represented in the boundary region between the materials A and B of the sample 1 is indicated with a dotted line in the maximum contrast mapping image.

The maximum contrast image and the maximum contrast mapping image are generated as described above.

A user can easily identify the boundary between the materials with different reflectivities in the sample 1 against an ultraviolet light in the same wavelength band by referencing this image.

Generation of a three-dimensional color image, which is one type of the synthesis observation images, is described next with reference to a screen example shown in FIG. 8.

Figure 8:
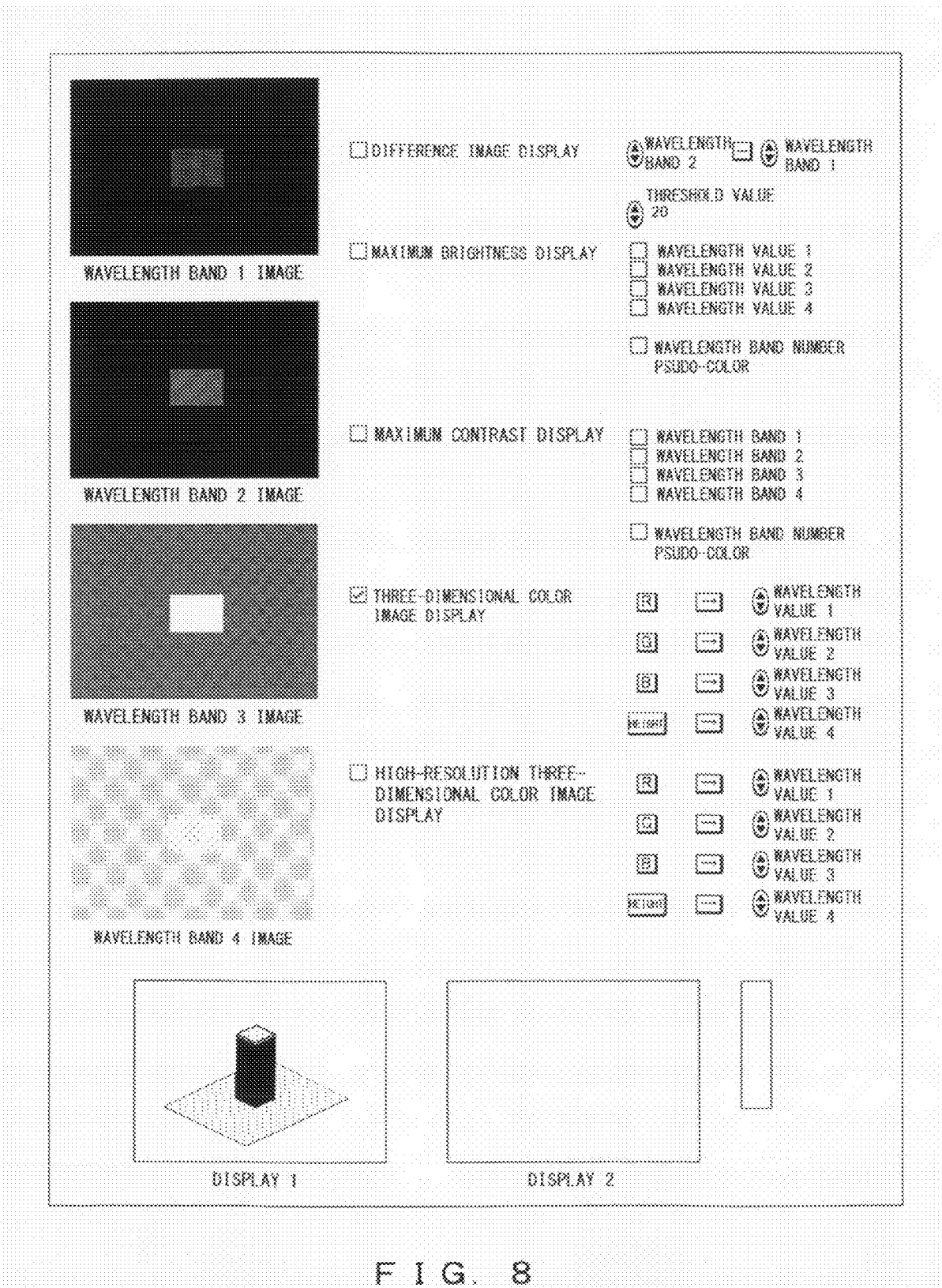
FIG. 8 is a schematic diagram (No. 4) showing a display example of a synthesis observation image on the GUI Screen.

On the GUI screen 50 shown in FIG. 8, a "three-dimensional color image display" is selected in the display method selecting section 52. Additionally, in the parameter input section 53, the "wavelength band 1", the "wavelength band 2", and the "wavelength band 3" are selected respectively for "R", "G", and "B", and also the "wavelength band 4" is selected for the "height". At this time, the image processing unit 19b executes a process for generating a three-dimensional image as follows.

Since all of the "wavelength band 1", the "wavelength band 2", the "wavelength band 3", and the "wavelength band 4" are selected in the parameter input section 53, the image processing unit 19b initially executes a process for reading from the storing unit 18 the observation images obtained when the ultraviolet lights in the "wavelength band 1", the "wavelength band 2", the "wavelength band 3", and the "wavelength band 4", which are mutually different, are irradiated on the sample 1. Then, the image processing unit 19b generates a two-dimensional color image by using the brightness values of each pixel configuring the three observation images such as the "wavelength band 1 image", the "wavelength band 2 image", and the "wavelength band 3 image" as the brightness values of color components (red (R) component, green (G) component, and blue (B) component) of the three primary colors in pixels the positions of which make a correspondence. Thereafter, the image processing unit 19b establishes a correspondence between the brightness value of each pixel configuring the "wavelength band 4 image", which is another observation image, and height information of the portion of the sample 1 displayed by the pixel the position of which makes a correspondence in the generated two-dimensional color image. The three-dimensional color image is generated in this way.

The control unit 19 executes a process for fitting thus generated three-dimensional color image into the "display 1" in the display result section 54 on the GUI screen 50, and for displaying the image on the display unit 17.

In the screen example shown in FIG. 8, the brightness level of the "wavelength band 3 image" is higher than those of the "wavelength band 1 image" and the "wavelength band 2 image" on the entire screen, and the regions of the upper surfaces of the materials A and B of the sample 1 in the three-dimensional color image displayed in the "display 1" of the display result section 54 are represented with a color closet to the hue made to correspond to the "wavelength band 3 image", namely, a color close to blue. In the screen example shown in FIG. 8, the color close to blue represented in the regions of the upper surfaces of the materials A and B of the sample 1 is represented by being crosshatched in the three-dimensional color image.

The three-dimensional color image is generated in this way. A user can obtain information about the reflectivities on the surface of the sample 1 against the ultraviolet lights in mutually different four wavelength bands only by referencing this image.

A two-dimensional color image may be generated by setting height information about the portion of the sample 1 displayed by each pixel configuring a three-dimensional color image to the same value in all of pixels instead of displaying the three-dimensional color image. A user can obtain information about the reflectivities on the surface of the sample 1 against ultraviolet lights in three mutually different wavelength bands if he or she references the two-dimensional color image.

Generation of a three-dimensional color maximum contrast image, which is one type of the synthesis observation images, is described next with reference to a screen example shown in FIG. 9.

Figure 9:
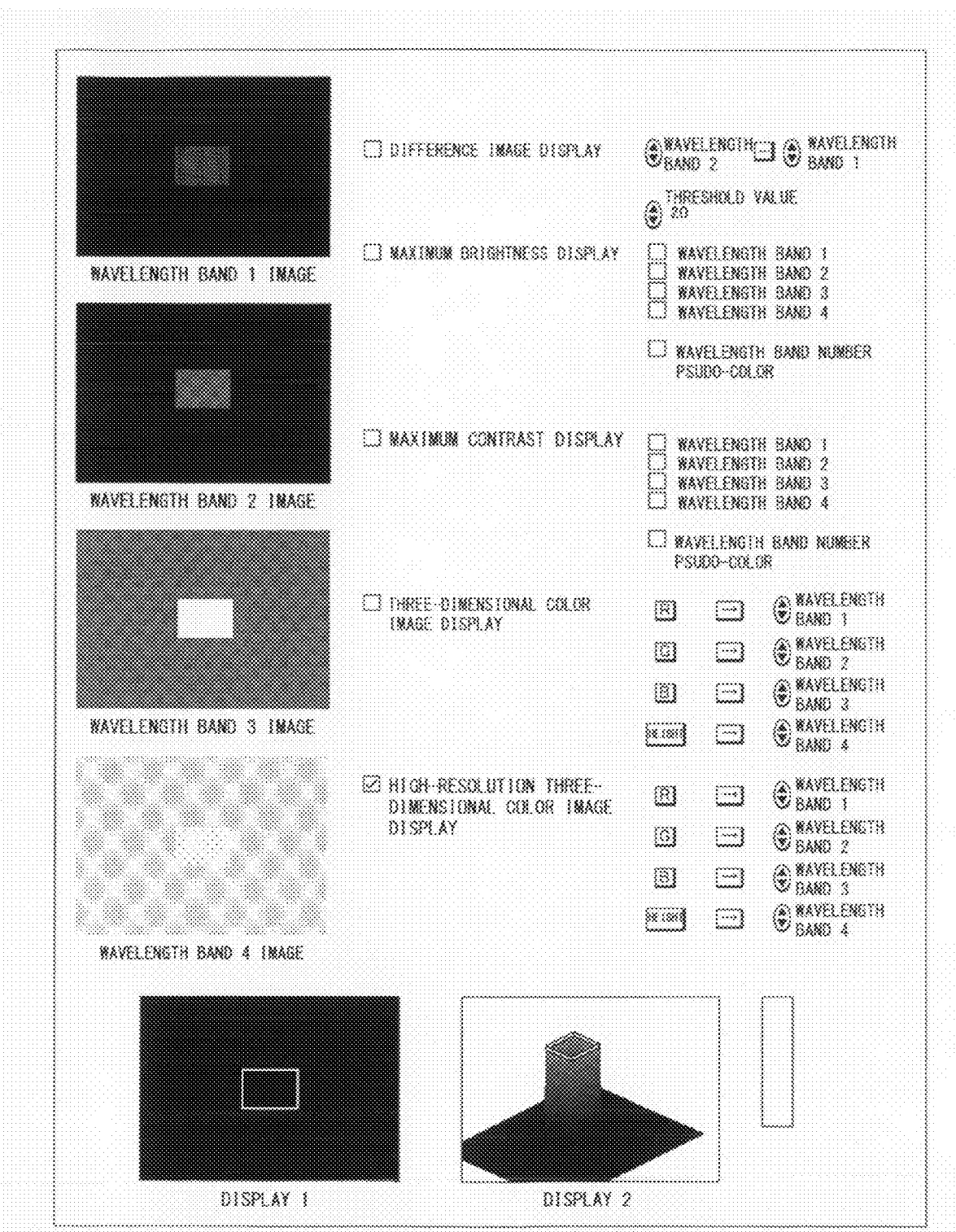
FIG. 9 is a schematic diagram (No. 5) showing a display example of synthesis observation images on the GUI Screen.

On the GUI screen 50 shown in FIG. 9, a "high resolution three-dimensional color image display" is selected in the display method selecting section 52. Additionally, in the parameter input section 53, the "wavelength band 1", the "wavelength band 2", and the "wavelength band 3" are selected respectively for "R", "G", and "B", and also the "wavelength band 4" is selected for the "height". At this time, the image processing unit 19b executes a process for generating a three-dimensional color maximum contrast image as follows.

FIG. 10 is described here. This figure is a flowchart showing the contents of the process for generating a three-dimensional color maximum contrast image, which is executed by the image processing unit 19b.

In FIG. 10, initially in S201, the image processing unit 19b executes a process for obtaining a maximum contrast image based on a plurality of observation images obtained when ultraviolet lights in different wavelength bands are irradiated on the sample 1 by executing the processes in S101 to S103 shown in FIG. 7.

Next, in S202, the image processing unit 19b executes a process for obtaining a three-dimensional color image based on the plurality of observation images obtained when the ultraviolet lights in the different wavelength bands are respectively irradiated on the sample 1 as described previously with reference to FIG. 8.

Then, in S203, the image processing unit 19b executes a process for calculating the brightness and the color components of each pixel configuring the two-dimensional color image obtained during the generation of the three-dimensional color image in the process of S202. The brightness and the color components of each pixel configuring the two-dimensional color image can be calculated, for example, by executing a known image data conversion process for converting the color space format of color image data from RGB into YC1C2 format.

Then, in S204, the image processing unit 19b executes a process for replacing the brightness component of the brightness and the color components of each pixel, which are calculated with the process of S203, with the brightness value of the pixel configuring the maximum contrast image obtained with the process of S201.

In S205, the image processing unit 19b executes a process for regenerating a three-dimensional color image based on the brightness component of each pixel after being replaced with the process of S204, the color component of each pixel calculated with the process of S203, and the height information of the portion of the sample 1 used to generate the three-dimensional image in the process of S202. Thereafter, the image processing unit 19b terminates the process shown in FIG. 10. The three-dimensional color image generated with the process of S205 is the three-dimensional color maximum contrast image.

Processing operations of the image processing unit 19b performed when instructions are issued on the GUI screen 50 as in the screen example shown in FIG. 9 are described here.

In the screen example shown in FIG. 9, all of the "wavelength band 1", the "wavelength band 2", the "wavelength band 3", and the "wavelength band 4" are selected in the parameter input section 53. Therefore, the image processing unit 19b executes a process for reading from the storing unit 18 the observation images obtained when the ultraviolet lights in the "wavelength band 1", the "wavelength band 2", the "wavelength band 3", and the "wavelength band 4", which are mutually different, are respectively irradiated on the sample 1, and for generating a maximum contrast image for each of the observation images based on the observation images.

At this time, the control unit 19 executes a process for fitting thus generated maximum contrast image into the "display 1" in the display result section 54 on the GUI screen 50, and for displaying the image on the display unit 17. This maximum contrast image is the same as that displayed in the "display 1" of the display result section 54 in the example of the GUI screen 50 shown in FIG. 6.

Subsequent to the generation of the maximum contrast image, the image processing unit 19b executes a process for generating a three-dimensional color image. On the GUI screen 50 shown in FIG. 9, in the parameter input section 53, the "wavelength band 1", the "wavelength band 2", and the "wavelength band 3" are selected respectively for "R", "G", and "B, and also the "wavelength band 4" is selected for the "height". Accordingly, the image processing unit 19b initially generates a two-dimensional color image by using the brightness value of each pixel configuring the three observation images such as the "wavelength band 1 image", the "wavelength band 2 image", and the "wavelength band 3 image" as the brightness value of each color component of the three primary colors in the pixel the position of which makes a correspondence. Then, the image processing unit 19b establishes a correspondence between the brightness value of each pixel configuring the "wavelength band 4 image", which is another observation image, and height information of the portion of the sample 1 displayed by the pixel the position of which makes a correspondence in the generated two-dimensional color image. The three-dimensional color image is generated in this way.

Next, the image processing unit 19b executes a process for calculating the brightness and the color components of each pixel configuring the above described two-dimensional color image, and a process for replacing the brightness component of the calculated brightness and color components of each pixel with the brightness value of a pixel configuring the maximum contrast image previously generated. Then, the image processing unit 19b executes a process for generating a three-dimensional color maximum contrast image based on the brightness component of each pixel after being replaced, the color component of each pixel calculated beforehand, and information about the height of the portion of the sample 1 used to generate the three-dimensional image.

The control unit 19 executes a process for fitting thus generated three-dimensional color maximum contrast image into the "display 2" in the display result section 54 on the GUI screen 50, and for displaying the image on the display unit 17.

In the screen example shown in FIG. 9, the evaluation values of contrast, which are calculated from the observation images such as the "wavelength band 1 image", the "wavelength range 2 image", the "wavelength band 3 image", and the "wavelength band 4 image" are "0" (namely, the contrast is the minimum) in the regions except for the boundary region between the materials A and B of the sample 1, whereas the evaluation value of contrast becomes the maximum for the "wavelength band 3 image" in the boundary region between the materials A and B of the sample 1. Accordingly, for the three-dimensional color maximum contrast image displayed in the "display 2" of the display result section 54, only the boundary region between the materials A and B of the sample 1 is represented with a color close to the hue made to correspond to the "wavelength band 3 image", namely, a color close to blue. In the screen example shown in FIG. 9, the color close to blue represented in the boundary region between the materials A and B of the sample 1 is represented by being crosshatched in the three-dimensional color maximum contrast image.

The three-dimensional color maximum contrast image is generated as described above. A user can obtain information about the reflectivities of the surface of the sample 1 against the ultraviolet lights in the four mutually different wavelength bands only by referencing this image. Additionally, the user can easily identify also a boundary between materials with different reflectivities against an ultraviolet light in the same wavelength band.

Additionally, a two-dimensional color maximum contrast image may be generated by setting height information about the portion of the sample 1 displayed by each pixel configuring a three-dimensional color maximum contrast image to the same value for all of pixels instead of displaying the three-dimensional color maximum contrast image. A user can obtain information about the reflectivities of the surface of the sample 1 against ultraviolet lights in three mutually different wavelength bands if he or she references the two-dimensional color maximum contrast image. Additionally, the user can easily identify also a boundary between materials with different reflectivities against an ultraviolet light in the same wavelength band.

Improvements in the process for generating a color image are described next.

In the above described process for generating a three-dimensional color image, a two-dimensional color image is initially generated, and a three-dimensional color image is then generated from the two-dimensional color image. This two-dimensional color image is generated in a pseudo manner by obtaining, for each wavelength band, observation images of the sample 1 when ultraviolet lights in three different wavelength bands are irradiated on the sample 1, and by using the brightness value of each pixel configuring the three obtained observation images as the brightness value of each color component of the three primary colors in the pixel the position of which makes a correspondence.

With this technique, however, the brightness values of the color components, which should originally be brightness values of the same pixel, are respectively displaced to brightness values at different positions if the sample 1 moves while obtaining an observation image for each wavelength band. As a result, a so-called color shift (color drift) becomes conspicuous in a generated color image in some cases. The following process for generating a color image reduces occurrences of this color shift.

In the multiband ultraviolet microscope apparatus 100 shown in FIG. 1, the control unit 19 causes the display unit 17 of the controlling device 103 to display the GUI screen 50 exemplified in FIG. 2 in a similar manner as in the above described case.

Next, a user puts the sample 1 on the stage 2. Then, the user makes the focus achievement and the observation position setting of the sample 1 by moving up/down the stage 2 in the direction of the optical axis of the objective lens 3 and by moving the stage 2 within the flat plane orthogonal to the direction of the optical axis while visually observing a visible observation image via the eyepiece unit 9 by irradiating a visible light on the sample 1. The focus achievement and the observation position setting may be made by irradiating an ultraviolet light on the sample 1 and by displaying an image obtained with the camera 14 on a display device as will be described later. Alternatively, the position at which the focus of the sample 1 is achieved may be automatically detected by using a known auto-focus function.

Upon completion of these operations, the user issues an instruction to start observation to the control unit 19 by operating the input unit 15. At this time, the user selects the "high resolution three-dimensional color image display" in the display method selecting section 52, and selects, in the parameter input section 53, for example, the "wavelength band 4", the "wavelength band3", and the "wavelength band 2" respectively for "R", "G", and "B", but selects none for the "height". Then, the image processing unit 19b executes a process for generating a two-dimensional pseudo-color image because no selection is made for the "height".

The process for generating a two-dimensional pseudo-color image where occurrences of a color shift are reduced, which is executed by the image processing unit 19b, is described next with reference to FIGS. 11 and 12.

FIG. 11 is a functional block diagram of the image processing unit 19b for executing the process for generating a two-dimensional pseudo-color image in which occurrences of a colors shift are reduced.

The image processing unit 19b shown in FIG. 11 is configured by comprising memories A 201a to C 201c, an image distributing unit 202, a pseudo-color synthesizing unit 203, and a synchronizing circuit 204.

The memories A 201a to C 201c are three storage regions for storing image data in a memory device.

The image distributing unit 202 distributes the image data of sample images output from the camera 14 to the memories A 201a to C 201c, which are made to store the distributed data.

The pseudo-color synthesizing unit 203 executes a pseudo-color process by using the image data of the three images stored in the memories A 201a to C 201c.

The synchronizing circuit 204 performs a control for synchronizing the distribution process executed by the image distributing unit 202 and the pseudo-color process executed by the pseudo-color synthesizing unit 203 with a trigger signal for instructing the capturing of an observation image of the sample 1, which is output from the control unit 19 to the camera 14.

The control unit 19 outputs the trigger signal for instructing the image capturing to the camera 14 subsequently to the control, which is performed for the light source device 102, for sequentially switching the wavelength band of an ultraviolet light emitted. Accordingly, any of the memories A 201a to C 201c stores an observation image distributed for each wavelength band of an ultraviolet light, which is irradiated on the sample 1 when the observation image is obtained, each time the camera 14 obtains an observation image, in accordance with the action of the synchronizing circuit 204. The pseudo-color synthesizing unit 203 generates a two-dimensional color image of the sample 1 based on the three observation images most recently stored in the memories A 201a to C 201c, namely, the three observation images obtained by irradiating ultraviolet lights in mutually different wavelength bands on the sample each time a new observation image is stored in any of the memories A 201a to C 201c, in accordance with the action of the synchronization circuit 204.

Figure 12:
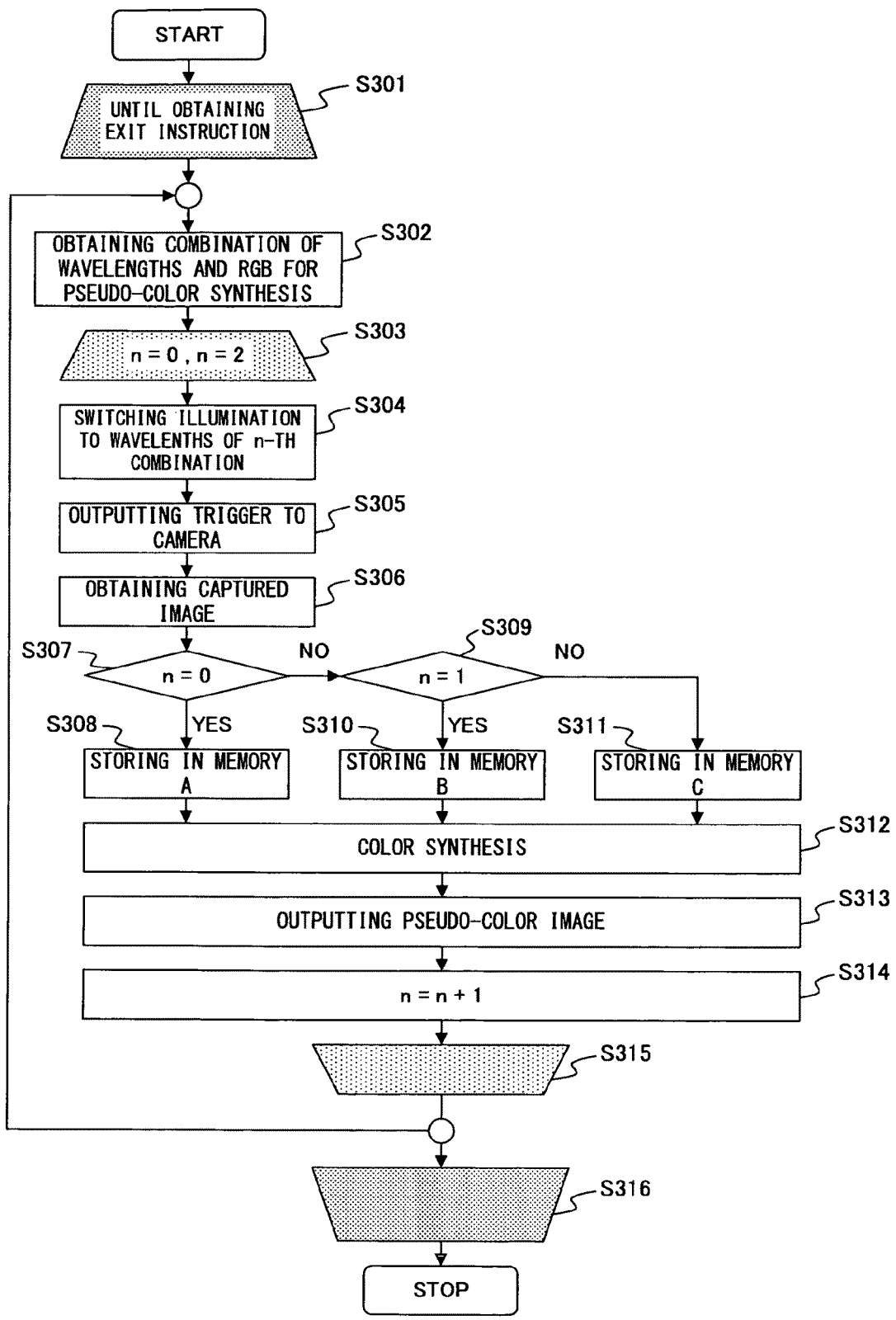
FIG. 12 is a flowchart showing the contents of a process for a pseudo-color synthesis output.

FIG. 12 is described next. FIG. 12 is a flowchart showing the contents of the process for a pseudo-color synthesis output, which is executed by the control unit 19.

Upon obtaining the instruction to start observation issued to the input unit 15, the control unit 19 starts to execute the process shown in FIG. 12, and repeats processes in S302 to S315, which are the processes between S301 and S316, until it obtains an EXIT instruction issued to the input unit 15.

In S302, the control unit 19 executes a process for obtaining instruction information about the wavelength bands of ultraviolet lights irradiated on the sample 1 when three observation images used to generate a two-dimensional pseudo-color image are obtained, and instruction information about a correspondence between each of the wavelength bands and each of the three primary colors (red (R) color, green (G) color, and blue (B) color) of light. Here, assume that the information instructing the "wavelength band 4", the "wavelength band 3", and the "wavelength band 2" respectively for "R", "G", and "B". Naturally, the relationship between the three observation images used to generate a two-dimensional pseudo-color image and each color component of the three primary colors of the two-dimensional pseudo-color image can be changed by making other selections on the GUI display screen 50.

Next, the control unit 19 repeats the processes in S304 to S314, which are the processes between S303 and S315, until a variable n the initial value of which is 0 is determined to be 2 in S315.

In S304, the control unit 19 functions as the light source controlling unit 19a, and executes a process for controlling the light source device 102 to start to emit an illumination light in an (n+1)-th ultraviolet wavelength band.

In S305, the control unit 19 executes a process for causing the camera 14 to capture the image of the sample 1 on which the illumination light in the (n+1)-th ultraviolet wavelength band is irradiated by transmitting the trigger signal to the camera 14.

The camera 14 captures the image of the sample 1 in accordance with this trigger signal, and transmits the image data of the captured observation image of the sample 1 to the control unit 19. The control unit 19 executes a process for obtaining the image data of this observation image in S306.

Thereafter, the control unit 19 functions as the image control unit 19b in S307 to S313.

Initially, in S307 to S311, the control unit 19 functions as the image distributing unit 202 for executing the process in synchronization with the trigger signal. Namely, the control unit 19 determines in S307 whether or not the variable n is 0. If the control unit 19 determines that the variable n is 0 (the determination results in "YES"), the process goes to S308. If the control unit 19 determines that the variable n is not 0 (the determination results in "NO"), the process goes to S309.

In S308, the control unit 19 executes a process for storing the image data of the observation image, which is obtained in S306, in the memory A 201a as the image data of the sample 1 on which the illumination light in the first ultraviolet wavelength band (the "wavelength band 4" in the above described example) is irradiated. Then, the process goes to S312.

In S309, the control unit 19 determines whether or not the variable n is 1. Here, if the control unit 19 determines that the variable n is 1 (the determination results in "YES"), the process goes to S310. If the control unit 19 determines that the variable n is not 1 (the determination results in "NO"), the process goes to S311.

In S310, the control unit 19 executes a process for storing the image data of the observation image, which is obtained in S306, in the memory B 201b as the image data of the sample 1 on which the illumination light in the second ultraviolet wavelength band (the "wavelength band 3" in the above described example) is irradiated. Thereafter, the process goes to S312.

In S311, as the variable n is 2, the control unit 19 executes a process for storing the image data of the observation image, which is obtained in S306, in the memory C 201c as the image data of the sample 1 on which the illumination light in the third ultraviolet wavelength band (the "wavelength band 2" in the above described example) is irradiated. Thereafter, the process goes to S312.

In S312, the control unit 19 functions as the pseudo-color synthesizing unit 203 that executes the process in synchronization with the trigger signal, and executes the pseudo-color process. Namely, the control unit 19 initially executes a process for reading the image data of the three observation images stored in the memories A 201a to C 201c. Then, the control unit 19 executes a process for generating a two-dimensional color image by using the brightness value of each pixel configuring the three observation images as the brightness value of each color component of the three primary colors in the pixel, the position of which makes a correspondence, based on the instruction information about the correspondences between the wavelength bands of the ultraviolet lights irradiated on the sample 1 when the three observation images are obtained and the three primary colors of light.

In S313, the control unit 19 executes a process for fitting thus generated two-dimensional color image into the "display 1" in the display result section 54 on the GUI screen 50, and for displaying the image on the display unit 17.

In S314, the control unit 19 executes a process for adding 1 to the current value of the variable n.

In S315, the control unit 19 executes a process for determining whether or not the current value of the variable n reaches 2. If the current value does not reach 2, the control unit 19 repeats the processes in S302 to S314. If the current value reaches 2, the control unit 19 stops repeating the processes.

In S316, the control unit 19 executes a process for determining whether or not the EXIT instruction issued to the input unit 15 is obtained. If the instruction is not obtained, the control unit 19 repeats the processes in S302 to S315. If the instruction is obtained, the control unit 19 terminates the process shown in FIG. 12.

With the process for a pseudo-color synthesis output shown in FIG. 12, the control unit 19 generates, displays, and outputs a two-dimensional pseudo-color synthesis image based on the total of three observation images, such as the newest observation image, the observation image preceding the newest one, and the observation image before the preceding one, which are obtained by irradiating ultraviolet lights in different wavelength bands on the sample 1 at the time of image capturing, in synchronization with the image capturing of the camera 14 until the control unit 19 obtains the EXIT instruction issued to the input unit 15. Accordingly, color shifts (color drifts) caused by the move of the sample 1 can be reduced in the displayed and output two-dimensional pseudo-color synthesis image by shortening the image capturing cycle of the camera 14 (namely, by shortening the repetitive interval of the processes in S302 to S315).

In the process shown in FIG. 12, the control unit 19 executes a process for verifying whether or not a change occurs in the instruction information about the wavelength bands of the ultraviolet lights irradiated on the sample 1 when the three observation images used to generate the two-dimensional pseudo-color image are obtained, and the instruction information about the correspondences between the wavelength bands and the three primary colors of light, each time the control unit 19 repeats the processes in S302 to S315. If a change occurs, the control unit 19 obtains the contents of the change in S302, and reflects the contents on the subsequent processes.

There are the total of six combinations of the correspondences between the wavelength bands of the ultraviolet lights irradiated on the sample 1 when the three observation images used to generate the two-dimensional pseudo-color image and the three primary colors of light. In the above described process shown in FIG. 12, the control unit 19 obtains instruction information about the combinations with the process of S302. Alternatively, the control unit 19 may generate all of two-dimensional pseudo-color images of the six combinations, and outputs to the display unit 17 as their listing to be displayed.

Figure 13:
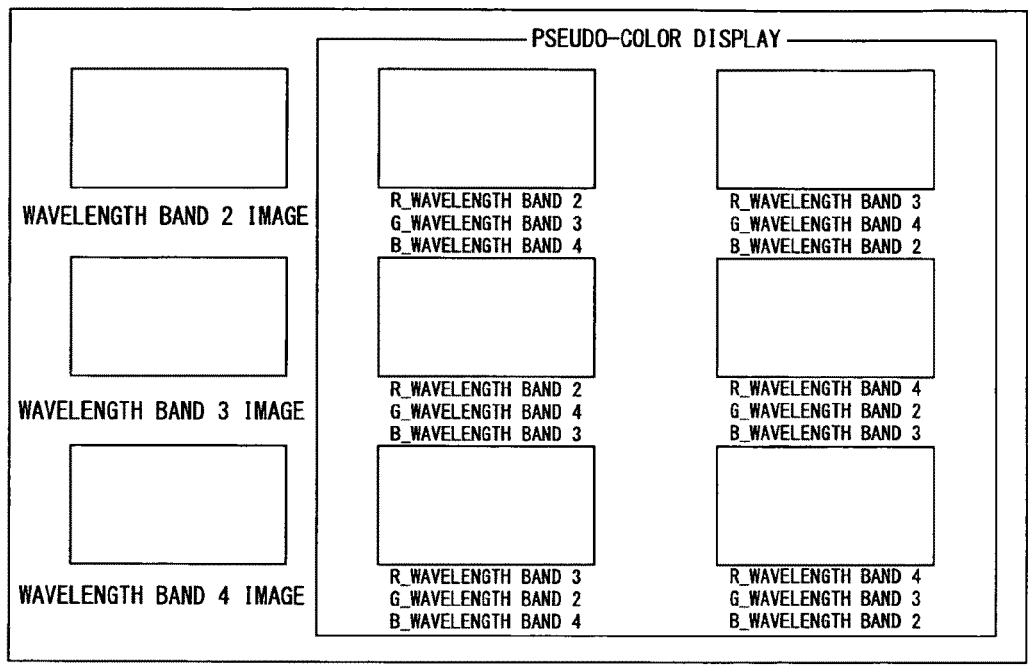
FIG. 13 is a schematic diagram showing an example of listing of two-dimensional pseudo-color images in all of six combinations of a correspondence between each wavelength band irradiated on a sample when three observation images are obtained and each of the three primary colors of light.

To implement this, the pseudo-color synthesizing unit 203 of the control unit 19 may make all of pseudo-color syntheses of all the six combinations by using the image data of the observation images stored in the memories A 201a to C 201c in synchronization with the trigger signal for the image capturing instruction issued to the camera 14, and the control unit 19 may output and display the listing of two-dimensional pseudo-color images for all the six combinations as exemplified in FIG. 13 by controlling the display unit 17.

With such a display, an observer can observe the two-dimensional pseudo-color images of all the six combinations at one time in addition to the effect of reducing occurrences of the above described color shift (color drift) caused by the move of the sample. As a result, a correspondence between a wavelength band and RGB, which is optimum for a fault examination or structural observation of the sample 1, can be easily found.

Additionally, the technique for reducing occurrences of a color shift in a color image as described above is applicable to the generation of a three-dimensional color image that is one of the synthesis observation images.

To implement this, a user of the multiband ultraviolet microscope apparatus 100 issues an instruction to select a wavelength band of an ultraviolet light irradiated on the sample 1 when an observation image used to establish a correspondence with the height information of a portion of the sample 1 is obtained in addition to the selection instruction of the correspondences between the wavelength bands of ultraviolet lights irradiated on the sample 1 when three observation images used to generate a two-dimensional pseudo-color image are obtained and the three primary colors of light by operating the input unit 15. Additionally, one more memory D (not shown) is secured in addition to the memories A 201a to C 201c as the memory regions secured in the memory device in the image processing unit 19b of the control unit 19.

Here, the control unit 19 controls the light source device 102 to emit an illumination light in the fourth ultraviolet band succeeding the first to the third ultraviolet bands. Then, the control unit 19 executes a process for transmitting the trigger signal to the camera 14, and for causing the camera 14 to capture the image of the sample 1 on which the illumination light in the fourth ultraviolet band is irradiated, and further executes a process for obtaining the image data of the observation image captured in accordance with the trigger signal, and for distributing the image data to the memory D, which is made to store the image data. Thereafter, the image processing unit 19b of the control unit 19 executes a process for establishing a correspondence with the pixel the position of which makes a correspondence in a two-dimensional pseudo-color image generated by the pseudo-color synthesizing unit 203 by using the brightness value of each pixel of the observation image stored in the memory D as the height information of the portion of the sample 1. The three-dimensional pseudo-color image is generated in this way.

By repeating this process for generating a three-dimensional pseudo-color image in synchronization with the image capturing of the camera 14, a three-dimensional pseudo-color synthesis image is generated based on the total of four observation images, such as the newest observation image, and three observation images before the newest one, which are obtained by irradiating ultraviolet lights in mutually different wavelength bands on the sample 1 at the time of image capturing. Accordingly, occurrences of a color shift (color drift) caused by the move of the sample 1 in the three-dimensional pseudo-color synthesis image to be output and displayed can be reduced by shortening the image capturing cycle of the camera 14.

Up to this point, some preferred embodiments according to the present invention have been described. However, the present invention is not limited to the above described preferred embodiments, and various improvements and modifications can be made within a scope that does not depart from the gist of the present invention.

What is claimed is:

1. An ultraviolet microscope apparatus comprising:
a light source for generating ultraviolet light;
an image capturing unit for obtaining an observation image of a sample by capturing an image of the sample on which the ultraviolet light is irradiated;
a synthesis observation image generating unit for generating a synthesis observation image of the sample based on a plurality of observation images of the same sample, the observation images being obtained by the image capturing unit in a same field of view under illumination by different wavelength bands of the ultraviolet light; and
a display unit for displaying the image generated by the synthesis observation image generating unit;
wherein:
the synthesis observation image is a difference image of the sample generated based on two observation images obtained under illumination by respective different wavelength bands of the ultraviolet light; and
the synthesis observation image generating unit generates the difference image by calculating, for each pixel, a difference between brightness values of pixels at corresponding positions in the two observation images, and by establishing a correspondence between a value of the calculated difference and a brightness value of a pixel having a corresponding position in the difference image.

2. The ultraviolet microscope apparatus according to claim 1, wherein the synthesis observation image generating unit establishes the correspondence between the value of the calculated difference and the brightness value of the pixel having the corresponding position in the difference image by using a value resulting from binarizing the value of the calculated difference after making a largeness/smallness comparison of the value of the calculated difference with a predetermined threshold value, as the brightness value of the corresponding pixel.

3. An ultraviolet microscope apparatus comprising:
a light source for generating ultraviolet light;
an image capturing unit for obtaining an observation image of a sample by capturing an image of the sample on which the ultraviolet light is irradiated;
a synthesis observation image generating unit for generating a synthesis observation image of the sample based on a plurality of observation images of the same sample, the observation images being obtained by the image capturing unit in a same field of view under illumination by different wavelength bands of the ultraviolet light; and
a display unit for displaying the image generated by the synthesis observation image generating unit;
wherein:
the synthesis observation image is a maximum brightness image of the sample; and
the synthesis observation image generating unit generates the maximum brightness image by obtaining, for each pixel, a maximum value of brightness values of pixels at corresponding positions in the plurality of observation images, and by using the obtained maximum value as a brightness value of a pixel having a corresponding position in the maximum brightness image.

4. An ultraviolet microscope apparatus comprising:
a light source for generating ultraviolet light;
an image capturing unit for obtaining an observation image of a sample by capturing an image of the sample on which the ultraviolet light is irradiated;
a synthesis observation image generating unit for generating a synthesis observation image of the sample based on a plurality of observation images of the same sample, the observation images being obtained by the image capturing unit in a same field of view under illumination by different wavelength bands of the ultraviolet light; and
a display unit for displaying the image generated by the synthesis observation image generating unit;
wherein:
the synthesis observation image is a maximum brightness mapping image of the sample; and
the synthesis observation image generating unit generates the maximum brightness mapping image by obtaining, for each pixel, a pixel with a maximum brightness value among pixels at corresponding positions in the plurality of observation images, and by mapping information, which indicates the wavelength band of the ultraviolet light irradiated on the sample when the observation image including the obtained pixel was captured, to a pixel having a corresponding position in the maximum brightness mapping image.

5. The ultraviolet microscope apparatus according to claim 4, wherein the display unit displays the maximum brightness mapping image in colors such that a correspondence is established between the information indicating different wavelength bands of the ultraviolet light and respective different hues.

6. An ultraviolet microscope apparatus comprising:
a light source for generating ultraviolet light;
an image capturing unit for obtaining an observation image of a sample by capturing an image of the sample on which the ultraviolet light is irradiated;
a synthesis observation image generating unit for generating a synthesis observation image of the sample based on a plurality of observation images of the same sample, the observation images being obtained by the image capturing unit in a same field of view under illumination by different wavelength bands of the ultraviolet light; and
a display unit for displaying the image generated by the synthesis observation image generating unit;
wherein:
the synthesis observation image is a maximum contrast image of the sample; and
the synthesis observation image generating unit generates the maximum contrast image by obtaining, for each pixel in each of the plurality of observation images, an evaluation value representing a contrast, by obtaining, for each pixel, a pixel with a maximum contrast among pixels at corresponding positions in the plurality of observation images based on the evaluation value, and by using the evaluation value of the obtained pixel with the maximum contrast as a brightness value of a pixel having a corresponding position in the maximum contrast image.

7. An ultraviolet microscope apparatus comprising:
a light source for generating ultraviolet light;
an image capturing unit for obtaining an observation image of a sample by capturing an image of the sample on which the ultraviolet light is irradiated;
a synthesis observation image generating unit for generating a synthesis observation image of the sample based on a plurality of observation images of the same sample, the observation images being obtained by the image capturing unit in a same field of view under illumination by different wavelength bands of the ultraviolet light; and a display unit for displaying the image generated by the synthesis observation image generating unit;

wherein:
the synthesis observation image is a maximum contrast mapping image of the sample; and
the synthesis observation image generating unit generates the maximum contrast mapping image by obtaining, for each pixel in each of the plurality of observation images, an evaluation value representing a contrast, by obtaining, for each pixel, a pixel with a maximum contrast among pixels at corresponding positions in the plurality of observation images based on the evaluation value, and by mapping information, which indicates the wavelength band of the ultraviolet light irradiated on the sample when the observation image including the obtained pixel with the maximum contrast was captured, to a pixel having a corresponding position in the maximum contrast mapping image.

8. The ultraviolet microscope apparatus according to claim 7, wherein the display unit displays the maximum contrast mapping image in colors such that a correspondence is established between the information indicating different wavelength bands of the ultraviolet light and respective different hues.

9. An ultraviolet microscope apparatus comprising:
a light source for generating ultraviolet light;
an image capturing unit for obtaining an observation image of a sample by capturing an image of the sample on which the ultraviolet light is irradiated;
a synthesis observation image generating unit for generating a synthesis observation image of the sample based on a plurality of observation images of the same sample, the observation images being obtained by the image capturing unit in a same field of view under illumination by different wavelength bands of the ultraviolet light; and
a display unit for displaying the image generated by the synthesis observation image generating unit;
wherein:
the synthesis observation image is a three-dimensional color image of the sample, which is generated based on first, second, third, and fourth observation images obtained under illumination by respective different wavelength bands of the ultraviolet light; and
the synthesis observation image generating unit generates the three-dimensional color image by using a brightness value of each pixel of the first, the second, and the third observation images as a brightness value of each color component of three primary colors in a pixel having a corresponding position in a two-dimensional color image, and by establishing a correspondence between a brightness value of each pixel of the fourth observation image and height information of a portion of the sample displayed by a pixel having a corresponding position in the two-dimensional color image.

10. The ultraviolet microscope apparatus according to claim 9, wherein the synthesis observation image generating unit further generates a three-dimensional color maximum contrast image based on a two-dimensional color maximum contrast image and the height information by obtaining an evaluation value representing a contrast for each pixel of the first, the second, the third, and the fourth observation images, by obtaining, for each pixel, a pixel with a maximum contrast among pixels at corresponding positions in the four observation images, based on the evaluation value, and by obtaining the two-dimensional color maximum contrast image by replacing a brightness component of each pixel in the two-dimensional color image with a brightness value of the obtained pixel with the maximum contrast having a corresponding position.

11. The ultraviolet microscope apparatus according to claim 10, wherein the synthesis observation image generating unit further generates a two-dimensional color maximum contrast image by setting the height information of the portion of the sample displayed by each pixel of the three-dimensional color maximum contrast image to a same value in all of the pixels.

12. An ultraviolet microscope apparatus comprising:
a light source for generating ultraviolet light;
an image capturing unit for obtaining an observation image of a sample by capturing an image of the sample on which the ultraviolet light is irradiated;
a synthesis observation image generating unit for generating a synthesis observation image of the sample based on a plurality of observation images of the same sample, the observation images being obtained by the image capturing unit in a same field of view under illumination by different wavelength bands of the ultraviolet light;
a display unit for displaying the image generated by the synthesis observation image generating unit;
a controlling unit for controlling the light source to sequentially switch the wavelength band of the ultraviolet light, and for controlling the image capturing unit to obtain one of the observation images each time the wavelength band is switched; and
an image storing unit for storing the observation images by distributing the observation image for each wavelength band when the observation image is obtained, each time the image capturing unit obtains an observation image, wherein the image storing unit stores respective observation images for at least three wavelength bands of the ultraviolet light;
wherein:
the synthesis observation image generating unit generates, as the synthesis observation image, a two-dimensional color image of the sample based on three observation images, which were most recently stored in the image storing unit and which were obtained under illumination of the sample by respective different wavelength bands of the ultraviolet light, each time a new observation image is stored in the image storing unit, and
the synthesis observation image generating unit generates the two-dimensional color image by establishing a correspondence between a brightness value of each pixel of the three observation images and a brightness value of each color component of three primary colors in a pixel having a corresponding position in the two-dimensional color image.

13. The ultraviolet microscope apparatus according to claim 12, wherein a relationship between the three observation images and each color component of the three primary colors in the two-dimensional color image when the synthesis observation image generating unit establishes the correspondence in order to generate the two-dimensional color image can be changed.

* * * * *